(12) United States Patent
Croak et al.

(10) Patent No.: US 7,733,847 B1
(45) Date of Patent: Jun. 8, 2010

(54) METHOD AND APPARATUS FOR ROUTING A CALL IN A PACKET-SWITCHED NETWORK

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

(*) Notice: Subject to any disclaimer, the term of this patent is extended or adjusted under 35 U.S.C. 154(b) by 1306 days.

(21) Appl. No.: 11/015,944

(22) Filed: Dec. 17, 2004

(51) Int. Cl.
*H04L 12/66* (2006.01)

(52) U.S. Cl. .................................. 370/352; 379/265.05

(58) Field of Classification Search ................. 370/352; 379/265.05, 265.09, 265.11
See application file for complete search history.

(56) References Cited

U.S. PATENT DOCUMENTS

| | | | |
|---|---|---|---|
| 6,118,782 A * | 9/2000 | Dixon et al. ................. 370/389 |
| 6,707,812 B1 * | 3/2004 | Bowman-Amuah ......... 370/353 |
| 6,807,423 B1 * | 10/2004 | Armstrong et al. .......... 455/440 |
| 7,016,343 B1 * | 3/2006 | Mermel et al. .............. 370/356 |
| 7,356,137 B1 * | 4/2008 | Burg et al. ............. 379/211.01 |
| 7,471,671 B2 * | 12/2008 | Xiong et al. ................. 370/352 |
| 2003/0056226 A1 * | 3/2003 | Lazarus et al. .............. 725/129 |
| 2003/0058844 A1 * | 3/2003 | Sojka et al. ................. 370/352 |

\* cited by examiner

*Primary Examiner*—Creighton Smith

(57) ABSTRACT

Method and system for establishing a call to a communication device in a packet-switched communication network is described. In one example, the system receives a call from a calling device at a server in a packet-switched communication network, where the call is a request for assistance pertaining to a technical field. The system then identifies at least one specific user from a plurality of specific users based on whether the specific user(s) is an expertise in the technical field in question. The system subsequently identifies at least one activated endpoint device from a plurality of activated endpoint devices that are associated with the previously identified specific user(s). Lastly, the system routes the call to the identified endpoint device(s) belonging to the specified user(s).

20 Claims, 3 Drawing Sheets

METHOD AND APPARATUS FOR ROUTING A CALL IN A PACKET-SWITCHED NETWORK

BACKGROUND OF THE INVENTION

1. Field of the Invention

Embodiments of the present invention generally relate to telecommunications systems and, more particularly, to a method and apparatus for routing a call in a packet-switched network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet-switched networks and circuit-switched networks. Exemplary packet-switched networks include internet protocol (IP) networks, asynchronous transfer mode (ATM) networks, frame-relay networks, and the like. An exemplary circuit-switched network includes a plain old telephone system (POTS), such as the publicly switched telephone network (PSTN). Although circuit-switched networks have traditionally been used to provide an effective means for voice communication, packet-switched networks are currently being utilized on a more frequent basis. One advantage afforded by packet-switched networks is the fact that various modes of communication may utilize this type of network, such as wireless phones, IP phones, and computers. The various methods and modes enable users to be contacted in different ways and are currently being used in several industries and computing environments.

Customer care agents or network operators responsible for the upkeep and operation of a network system occasionally need to escalate a service problem to specialized personnel in the event a complex technical problem arises. These specialized personnel are subject matter experts who possess the technical background and expertise to resolve difficult service problems, but whose job descriptions do not necessarily include this responsibility. In addition, these subject matter experts may be difficult to locate since they may be traveling or "roaming" between office buildings. They may also be working in test or development laboratories where wireless phone access is unreliable. Similarly, these subject matter experts may be vendors, and due to the nature of their position, are typically occupied working with other customers. Although these personnel frequently wear pagers, these devices do not provide a real-time immediate communication channel.

Accordingly, there exists a need in the art for a method and apparatus for routing escalation calls from customer care agents to mobile subject matter experts which traverse a packet-switched network.

SUMMARY OF THE INVENTION

In one embodiment, a method and system for routing a call to an endpoint device in a packet-switched communication network is described. In one embodiment, the system receives a call from a calling device at a server in the packet-switched communication network. This call is typically a request for service that pertains to a particular technical field. The system then identifies at least one endpoint user from a plurality of endpoint users based on whether the endpoint user(s) is a subject matter expert in the relevant technical field. The system subsequently identifies at least one activated endpoint device from a plurality of activated endpoint devices that are associated with the previously identified endpoint user(s). Lastly, the system routes the call to the activated endpoint device(s) that were identified belonging to the endpoint user(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

This invention enables escalation calls (e.g., calls made from a "first tier" customer care agent to a subject matter expert in the event a complex problem is encountered that cannot be resolved by the customer care agent) from customer care agents to traverse a packet-switched network 104 and to be routed to user elements 102 associated with mobile subject matter experts (SMEs). An SME's location information is transparently communicated to a server in a packet-switched-network 104 and is provided by registered endpoint devices the SME activates (i.e., turns on). Upon activating these endpoint devices, notification signals are sent to the network that indicate that the SME is available and a communication channel can be established for real-time communication.

Figure 1:
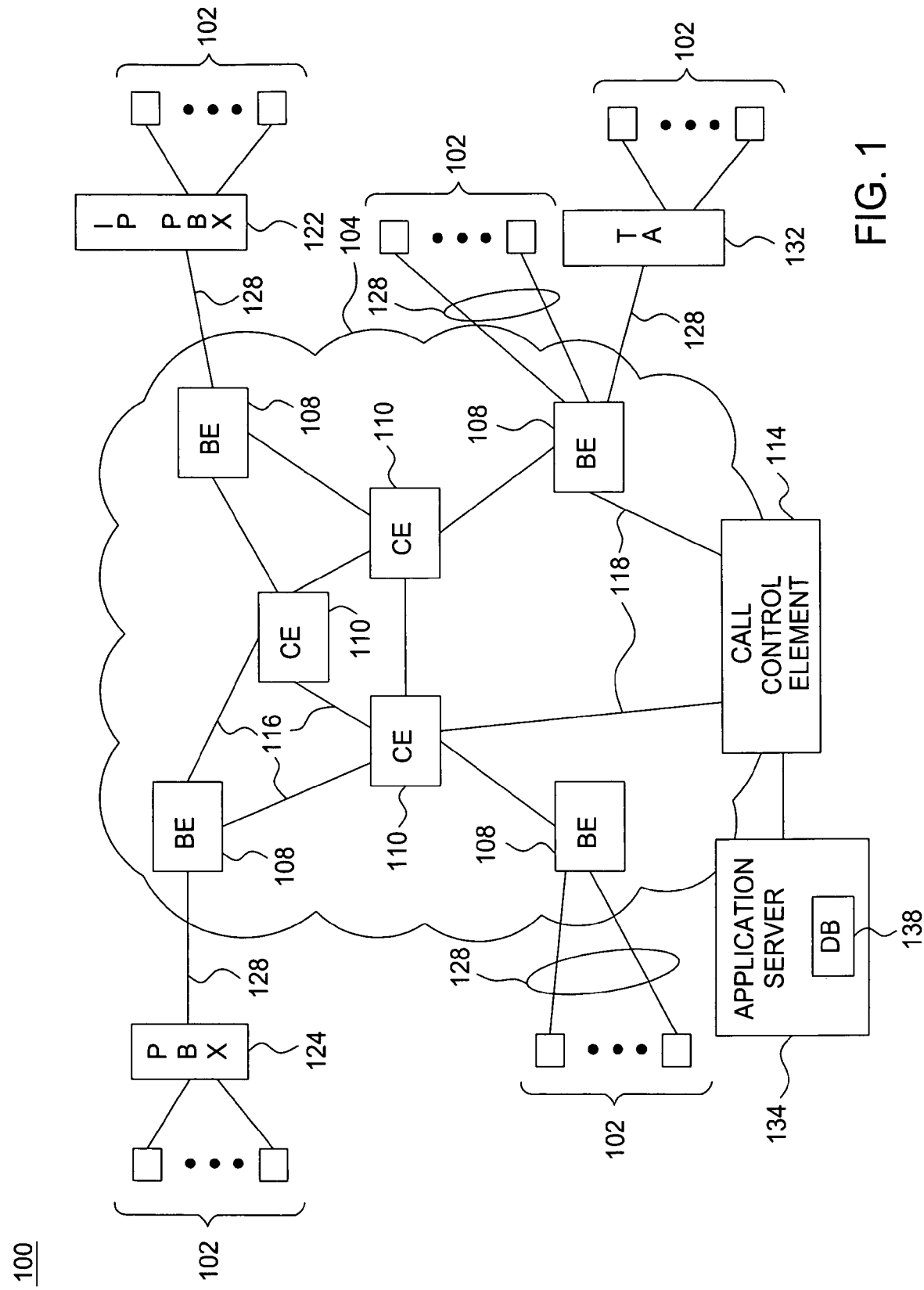
FIG. 1 is a block diagram depicting an exemplary embodiment of a communication system in accordance with the invention.

FIG. 1 depicts an exemplary embodiment of the communication system 100 in accordance with the invention. The communication system 100 comprises a plurality of user elements (UEs) 102 and a packet-switched network 104. The packet-switched network 104 illustratively comprises a plurality of border elements (BEs) 108, a plurality of core elements (CEs) 110, and a call control element (CCE) 114. The border elements 106 and the core elements 108 communicate via core communication links 116. The call control element 114 may be coupled to one or more of the core elements 110 or border elements 108 through communication link(s) 118. The packet-switched network 104 may comprise one or more of an internet protocol (IP) network, asynchronous transfer mode (ATM) network, frame relay network, and like type packet networks known in the art. For example, the packet-switched network 104 may comprise a voice-over-IP (VoIP) network.

A core element is a network element (such as a router, switch, cross-connect system, server, and the like) that facilitates control and communication between the border elements 106. A border element is a network element (such as a router, switch, cross-connect system, server, and the like) through which the user elements 102 connect to the packet-switched network 104. A border element typically performs functions such as routing, switching, security, admission control, and the like. In one embodiment, a border element translates access protocols into Session Initiation Protocol (SIP), which is then used to facilitate communication within a service provider IP infrastructure.

For purposes of clarity by example, only three core elements 110 are depicted in FIG. 1. It is to be understood that the packet-switched network 104 may include fewer or more core elements 110. Similarly, although four border elements 108 are depicted in FIG. 1 by example, the packet-switched network 104 may include fewer or more border elements. Although the border elements 108 are depicted as being directly connected to the core elements 110, other intervening equipment (not shown) may be deployed.

A user element 102, or endpoint device, is typically a user terminal (such as a telephone, computer, and the like) by which one or more users communicate with other users in the communication system 100. Some of the user elements 102 communicate with the border elements 108 via edge communication links 128. A user element (such as a time division multiplexing (TDM) phone, an IP phone, an Integrated Services Digital Network (ISDN) phone, a computer, and the like) is able to establish a connection with a border element through the communication links 128. Some of the user elements 102 are capable of being turned off and on or otherwise capable of toggling between an active state in which calls may be received and an inactive state in which calls cannot be received.

In one embodiment, a user element connects to the packet-switched network 104 through a circuit-switched connection with a border element. In another embodiment, a user element connects to the network 104 through an IP connection with a border element. In other embodiments, a user element may connect to a border element via a Signaling System 7 (SS7) connection, a Digital Subscriber Line (DSL) connection, a cable television connection, a customer managed router connection, a customer managed gateway connection, a local area network connection, a frame relay (FR) connection, an asynchronous transfer mode (ATM) connection, and like access technologies as known in the art. Furthermore, the user element can also be endpoint devices which include, but is not limited to, home or office personal computers (PCs), wireless phones, IP office and home phones, and the like. Those skilled in the art will appreciate that numerous other techniques for establishing a connection between a user element and a border element exist in the art.

Some of the user elements 102 (e.g., TDM phones) connect to a border element through an edge communication link via a TDM Private Branch Exchange (PBX) 124. Others of the user elements 102 (e.g., an IP phone) connect to a border element through an edge communication link via an IP Private Branch Exchange (IP-PBX) 122. Still others of the user elements 102 (e.g., computer) connect to a border element through an edge communication link directly. Others of the user elements 102 (e.g., ISDN phone) connect to a border element through an edge communication link via a terminal adapter (TA) 132.

The call control element (CCE) 114 resides within the VoIP infrastructure and is connected to the BEs using the Session Initiation Protocol (SIP) over the underlying packet-switched network 104. The CCE 114 is typically implemented as a Media Gateway Controller and performs network wide call control related functions as well as interacts with the appropriate VoIP service related servers when necessary. The CCE 114 functions as a SIP back-to-back user agent and is a signaling endpoint for all call legs between all BEs 108 and the CCE 114. The CCE 114 may need to interact with various VoIP related servers in order to complete a call that require certain service specific features, e.g. translation of an E.164 voice network address into an IP address. For purposes of clarity by example, the packet-switched network 104 is shown with one CCE 114. It is to be understood, however, that the packet-switched network 104 may include a plurality of call control elements, each configured to control various border elements, servers, and the like.

The application server 134 is shown in FIG. 1 to be coupled to the packet-switched network 104 and the call control element 114. The application server 134 may be any type of computer or device that stores data, manages network resources, and other conventional computing functions. Depending on the particular embodiment, there may be one or more application servers 134 coupled to one or more call control elements 114. Similarly, although the application server 134 is shown to be coupled to the network 104, the server (or plurality of servers) 134 may solely be connected to the network 104 via the call control element (or plurality of CCEs) in alternative embodiments.

The application server 134 also contains a database 138. The database 138 may be an electronic filing system or any collection of information organized in such a way that the server 134 can quickly select desired pieces of data. In one embodiment, the database 138 contains names and information pertaining to the SMEs (for example, the backgrounds and expertise of the SMEs, the types of endpoint devices belonging to the SMEs, etc.).

Figure 2:
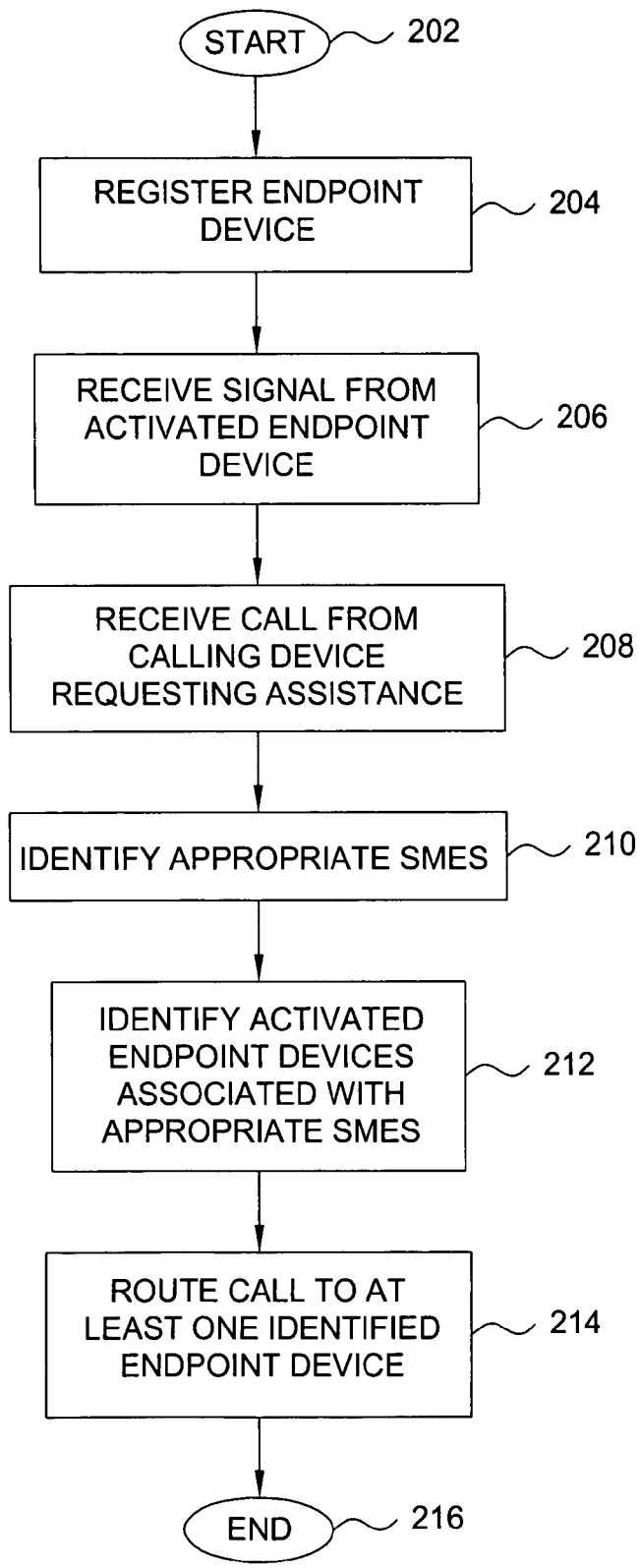
FIG. 2 is a flow diagram depicting an exemplary embodiment of a method for establishing a call in a packet-switched network in accordance with the invention.

FIG. 2 is a flow diagram depicting an exemplary embodiment of a method 200 for establishing a call in a packet-switched network in accordance with the invention. Aspects of the method 200 may be understood with reference to the communication system 100 of FIG. 1. The method 200 begins at step 202. At step 204, endpoint devices 102 associated with and belonging to endpoint users are registered with a application server 134 in the network 104. In one embodiment, the endpoint users are subject matter experts (SMEs) that individually possess at least one endpoint device, such as a wireless phone, IP office phone, IP home phone, personal computer, and any other type of device that allows for real time communication over a packet-switched (e.g. VoIP) network 104. In order for the SMEs to be contacted in an efficient manner, each endpoint device 102 belonging to an SME is registered with the server 134 so that the network 104 is informed of the communication means available to a particular SME. Furthermore, the technical field of expertise of each SME is also registered so that in the event a customer care agent requires expert assistance relating to a particular technical area, the SME (or SMEs) with the appropriate background or technical expertise will be contacted.

At step 206, a signal transmitted from an activated endpoint device 102 is received. In one embodiment, the signal is ultimately received by the server 134 in the network 104. By activating (i.e., turning on) the endpoint device 102, the SME notifies the server 134 that the SME is available to communicate via the activated endpoint device. It is important to note that an activated device is also a registered device (similarly, a plurality of activated devices is a subset of a plurality of registered devices, wherein a subset may include a portion or the entire number of registered endpoint devices). Likewise, if an endpoint device 102 is deactivated, the endpoint device will transmit a signal that notifies the server 134 that the SME can no longer be contacted via the deactivated endpoint device.

At step 208, a call from a calling device requesting assistance or service is received. In one embodiment, a customer care agent uses a calling device, which is any device that can initiate a call and communicate with the server 134, to call the server 134 in order to request service from an SME. Typically, the customer care agent encounters a service problem that requires the specialized and technical knowledge of an SME to resolve. Depending on the type of technical problem encountered, the customer care agent calls a specific virtual number that routes the caller to an available (i.e., activated) registered endpoint device 102 associated with an SME with the appropriate technical expertise needed to resolve the calling party's problem. In one embodiment, the specific virtual number may be previously associated with a particular type of SMEs.

At step 210, the SMEs with the appropriate technical background are identified. In one embodiment, all the SMEs and their respective areas of technical expertise are registered in a database 138 within the server 134. After a virtual number is called, the server 134 utilizes the database 138 and identifies all the SMEs with the appropriate technical background as "candidates" to resolve the present problem.

At step 212, the activated endpoint devices associated with the appropriate SMEs are identified. In one embodiment, the server utilizes the database 138 and the "list" of identified SME candidates compiled in step 210, to determine which SMEs presently have endpoint devices that are activated. After the completion of this step, the server 134 will then have assembled a list of SMEs with both the appropriate technical background needed to address the present problem as well as access to activated endpoint devices.

At step 214, the call is routed to at least one activated endpoint device associated with an identified SME. In one embodiment, the server 134 routes the call from calling device of the calling party to an SME with an activated endpoint device. In another embodiment, the server 134 routes the call to all the activated endpoint devices associated with the "selected" SME in the event the SME has more than one endpoint device turned on. In yet another embodiment, the server routes the call to the activated endpoint devices belonging to multiple SMEs simultaneously in order to ensure sufficient coverage. The method 200 then ends at step 216.

Figure 3:
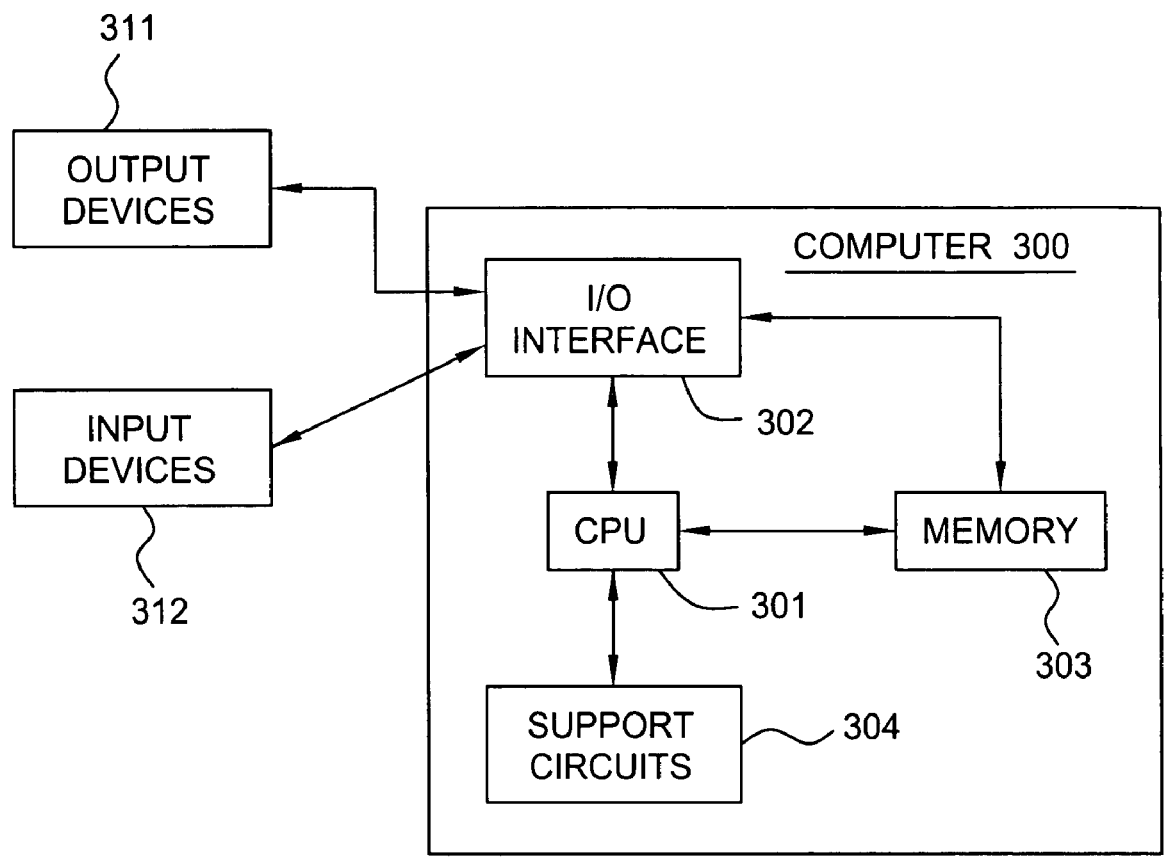
FIG. 3 is a block diagram depicting an exemplary embodiment of a computer suitable for implementing the processes and methods described herein.

FIG. 3 is a block diagram depicting an exemplary embodiment of a computer 300 suitable for implementing the processes and methods described herein. For example, the computer 300 may be used to implement the call control element 112, border elements 108, and core elements 110 of FIG. 1. The computer 300 includes a central processing unit (CPU) 301, a memory 303, various support circuits 304, and an I/O interface 302. The CPU 301 may be any type of microprocessor known in the art. The support circuits 304 for the CPU 301 include conventional cache, power supplies, clock circuits, data registers, I/O interfaces, and the like. The I/O interface 302 may be directly coupled to the memory 303 or coupled through the CPU 301. The I/O interface 302 may be coupled to various input devices 312 and output devices 311, such as a conventional keyboard, mouse, printer, display, and the like.

The memory 303 may store all or portions of one or more programs and/or data to implement the processes and methods described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 300 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 303. The memory 303 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM, or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method for establishing a call via a packet-switched communication network, comprising:

receiving said call from a calling device at a server in said packet-switched communication network, wherein said call is a request for assistance pertaining to a technical field, wherein said call is received via a virtual number that is associated with said technical field;

identifying via said virtual number at least one specific user from a plurality of registered specific users based on said at least one specific user having expertise in said technical field;

identifying at least one activated endpoint device from a plurality of activated endpoint devices associated with said at least one identified specific user; and routing said call to said at least one identified endpoint device.

2. The method of claim 1, further comprising:

registering a plurality of endpoint devices associated with said plurality of specific users at said server, wherein said plurality of activated endpoint devices is a subset of said plurality of endpoint devices; and receiving a signal from at least one endpoint device from said plurality of endpoint devices at said server in response to said at least one endpoint device being activated.

3. The method of claim 1, wherein said at least one identified specific user comprises at least one subject matter expert.

4. The method of claim 1, wherein said packet-switched communication network comprises an internet protocol (IP) network.

5. The method of claim 1, wherein said packet-switched communication network comprises a voice-over-IP (VoIP) network.

6. The method of claim 1, wherein said packet-switched communication network comprises an asynchronous transfer mode (ATM) network.

7. The method of claim 2, wherein said at least one endpoint device is at least one of a wireless phone, IP office phone, IP home phone, office personal computer, and home personal computer.

8. A communication system, comprising:
- means for receiving a call from a calling device at a server in a packet-switched communication network, wherein said call is a request for assistance pertaining to a technical field, wherein said receiving means receives said call via a virtual number that is associated with said technical field;
- means for identifying via said virtual number at least one specific user from a plurality of registered specific users based on said at least one specific user having expertise in said technical field;
- means for identifying at least one activated endpoint device from a plurality of activated endpoint devices associated with said at least one identified specific user; and
- means for routing said call to said at least one identified endpoint device.

9. The communication system of claim 8, further comprising:
- means for registering a plurality of endpoint devices associated with said plurality of specific users at said server, wherein said plurality of activated endpoint devices is a subset of said plurality of endpoint devices; and
- means for receiving a signal from at least one endpoint device from said plurality of endpoint devices at said server in response to said at least one endpoint device being activated.

10. The communication system of claim 8, wherein said at least one identified specific user comprises at least one subject matter expert.

11. The communication system of claim 8, wherein said packet-switched communication network comprises an internet protocol (IP) network.

12. The communication system of claim 8, wherein said packet-switched communication network comprises a voice-over-IP (VoIP) network.

13. The communication system of claim 8, wherein said packet-switched communication network comprises an asynchronous transfer mode (ATM) network.

14. The communication system of claim 9, wherein said at least one endpoint device is at least one of: a wireless phone, IP office phone, IP home phone, office personal computer, and home personal computer.

15. A computer readable medium having stored thereon instructions that, when executed by a processor, cause the processor to perform a method of establishing a call to a communication device in a packet-switched communication network, comprising:
- receiving said call from a calling device at a server in said packet-switched communication network, wherein said call is a request for assistance pertaining to a technical field, wherein said call is received via a virtual number that is associated with said technical field;
- identifying via said virtual number at least one specific user from a plurality of registered specific users based on said at least one specific user having expertise in said technical field;
- identifying at least one activated endpoint device from a plurality of activated endpoint devices associated with said at least one identified specific user; and
- routing said call to said at least one identified endpoint device.

16. The computer readable medium of claim 15, further having instructions comprising:
- registering said plurality of endpoint devices associated with said plurality of specific users at said server; and
- receiving a signal from at least one endpoint device from said plurality of endpoint devices at said server in response to said at least one endpoint device being activated.

17. The computer readable medium of claim 15, wherein said at least one identified specific user comprises at least one subject matter expert.

18. The computer readable medium of claim 15, wherein said packet-switched communication network comprises an internet protocol (IP) network.

19. The computer readable medium of claim 15, wherein said packet-switched communication network comprises a voice-over-IP (VoIP) network.

20. The computer readable medium of claim 16, wherein said at least one endpoint device is at least one of: a wireless phone, IP office phone, IP home phone, office personal computer, and home personal computer.

* * * * *